United States Patent Office 3,048,637
Patented Aug. 7, 1962

---

3,048,637
2'-HYDROXY-3'-NITRO-5'-PHENYLPROPIO-PHENONE
Carl B. Havens, Midland, and Ronald G. Brookens, Auburn, Mich., assignors to The Dow Chemical Company, Midland, Mich., a corporation of Delaware
No Drawing. Filed Nov. 30, 1959, Ser. No. 856,019
1 Claim. (Cl. 260—592)

This invention is concerned with 2'-hydroxy-3'-nitro-5'-phenylpropiophenone having the structure

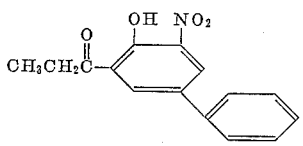

The product of this invention is a yellow solid soluble in many organic solvents such as acetone, alcohol, benzene, toluene, xylene and substantially insoluble in water. The product is useful as a pesticide particularly for the control of soil-infesting parasites.

The 2'-hydroxy-3'-nitro-5'-phenylpropiophenone may be prepared by nitrating 2'-hydroxy-5'-phenylpropiophenone.

In a preferred method for carrying out the reaction, a nitrating mixture consisting of concentrated nitric acid in concentrated sulfuric acid is added slowly with cooling to a solution of 2'-hydroxy-5'-phenylpropiophenone in concentrated sulfuric acid. The reaction takes place in the temperature range of from about —5° C. to about 0° C. over a period of from about ½ hour to 3 hours with the formation of the desired 2'-hydroxy-3'-nitro-5'-phenylpropiophenone. The reaction mixture is then poured into ice water to precipitate the desired product. The latter may then be recovered by filtration and purified, if desired, by conventional procedures.

In a representative operation, a nitrating solution consisting of 15 milliliters of concentrated nitric acid (specific gravity 1.44 at 15.5° C) and 22 milliliters of concentrated sulfuric acid was added slowly with stirring to a solution of 41 grams (0.15 mole) of 2'-hydroxy-5'-phenylpropiophenone in 54 milliliters of concentrated sulfuric acid. The reaction was carried out over a 2 hour period while the temperature was maintained between —5° C. and 0° C. At the end of this period, the reaction mixture was poured into ice water to precipitate the desired 2'-hydroxy-3'-nitro-5'-phenylpropiophenone product as a yellowish-brown solid. The latter was recovered by filtration and washed repeatedly with water until the wash water was free of acid. The crude product was purified by dissolving in ethyl ether, the ether solution washed with water and the ether then vaporized to recover the purified product as residue. The latter had a melting point of 55°–60° C. The structure of the product was verified by infrared analyses.

2'-hydroxy-3'-nitro-5'-phenylpropiophenone is useful as a parasiticide and adapted to be employed for the control of nematodes, cockroaches, fungi and bacteria. In a representative operation for its use as a nematocide, 2'-hydroxy-3'-nitro-5'-phenylpropiophenone was dispersed in water to prepare a composition containing 10 parts of the propiophenone compound per million parts of aqueous dispersion. This composition gave good control of larvae of the root-knot nematode (Meloidogyne sp.) contacted therewith.

We claim:
2'-hydroxy-3'-nitro-5'-phenylpropiophenone.

References Cited in the file of this patent

Bradsher et al.: J. Am. Chem. Soc., vol. 76, pages 2357–62 (1954).
Buu-Hoi et al.: Chem. Abstracts, vol. 50, page 14754 (1956).
Szell et al.: Chem. Abstracts, vol 51, page 16346 (1957).

(Copies of above in Library)